Jan. 23, 1940.　　　J. C. BOSTELMANN, JR　　　2,188,098
CHART FOR PIANO PLAYING
Filed March 2, 1935　　　2 Sheets-Sheet 2
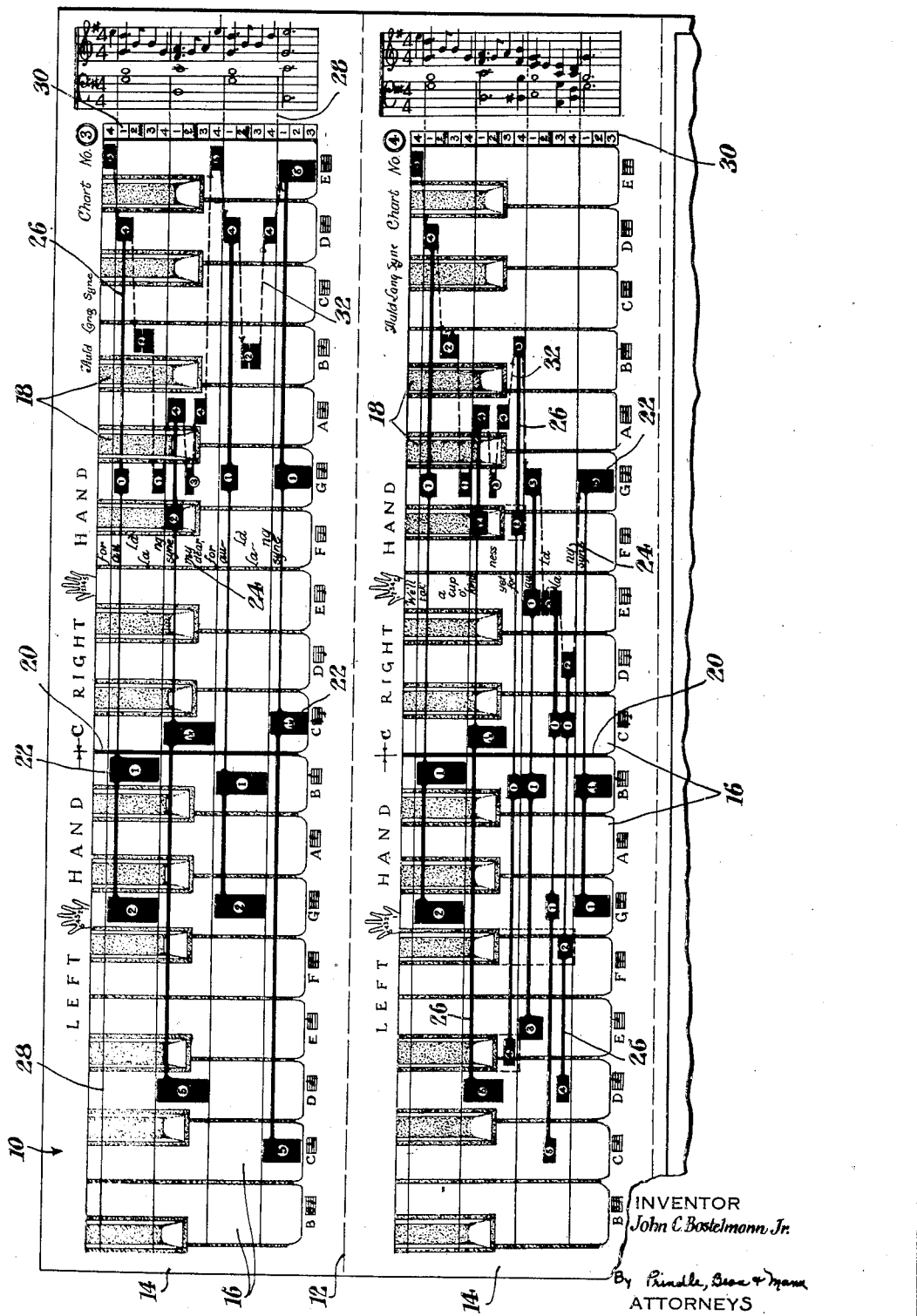
INVENTOR
John C. Bostelmann Jr.
By Prindle, Bean & Mann
ATTORNEYS Patented Jan. 23, 1940

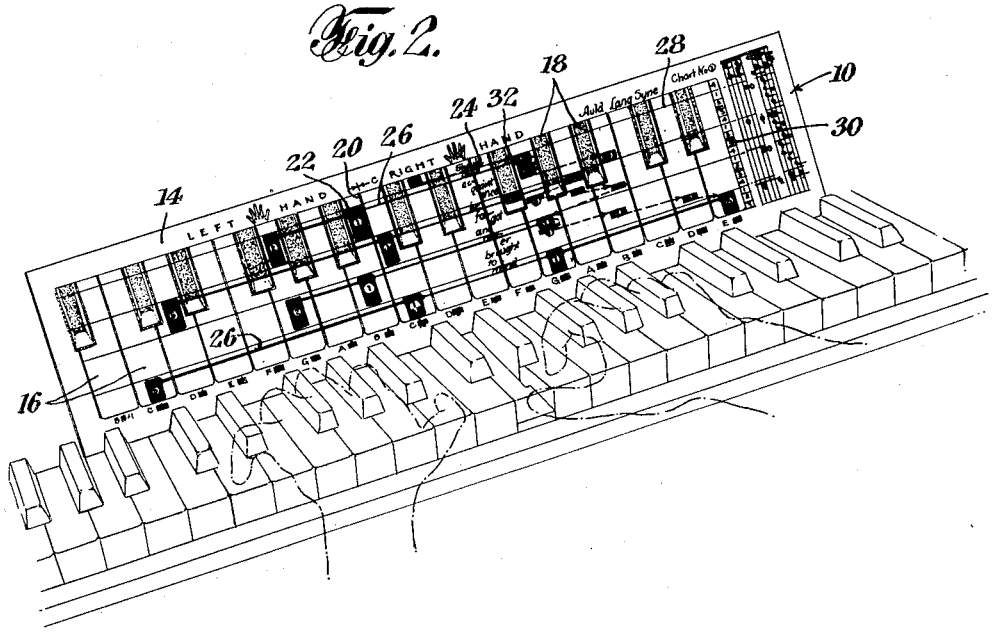
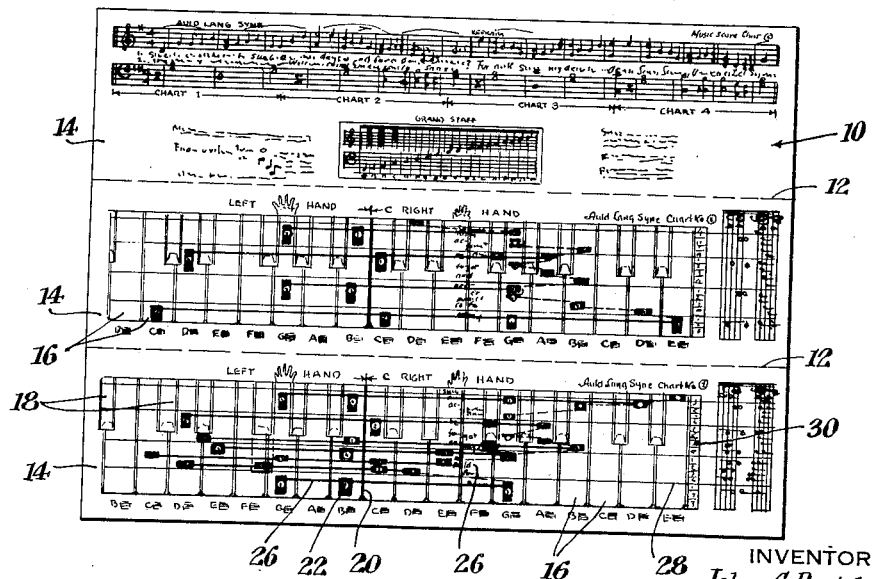

2,188,098

UNITED STATES PATENT OFFICE 2,188,098

CHART FOR PIANO PLAYING

John C. Bostelmann, Jr., Hastings on Hudson, N. Y.

Application March 2, 1935, Serial No. 9,039

5 Claims. (Cl. 84—479)

My present invention relates to improvements in charts for piano playing representing a musical composition and embodying playing aids related to the piano keys and supportable in relation to said keys whereby the pupil is enabled more quickly to understand, play and enjoy the composition and soon play it directly from the piano score.

To the accomplishment of the foregoing, my invention consists in the construction, combination and arrangement of the parts and features of the device hereinafter described and sought to be defined in the appended claims, reference being had to the accompanying drawings, forming a part hereof, and which show, for the purpose of illustrative disclosure, but without limiting the invention to all the details thereof, a preferred embodiment of my invention, it being understood that various changes may be made in practice within the scope of the claims without departing from my invention.

In the drawings:

Fig. 1 shows the front face of the preferred device which is shown fully opened up to expose the several panels and charts of which it is made up;

Fig. 2 shows the device folded as intended to be used and positioned at the back of the piano keyboard to expose one of the panels and the chart thereon; and Fig. 3 shows the rear face or back of the device which has been unfolded to show two of the panels and the charts thereon, the third and lowermost panel being omitted from this figure.

In the drawings, 10 designates the device as an entirety consisting of a single sheet of heavy paper or thin cardboard, best shown in Fig. 1, foldable on parallel lines 12 into parallel panels 14 on which charts including piano playing aids are printed. The total size of the sheet and the number of panels may of course vary depending on the length of the musical composition which the device embodies. The means and symbols to be hereinafter described which constitute the piano playing aids are printed or otherwise applied and shown on the front and back faces of the panels. The illustrated device to enable the playing of "Auld Lang Syne" has three panels. Fig. 2 shows the normal use of the device which is with the sheet folded along the lines 12 and then positioned at the back of the keyboard so as to expose the desired face of the desired panel and chart toward the player seated at the piano.

In said Fig. 2 it will be seen that the sheet has been folded and positioned so as to expose panel chart No. 1. Compare the opened up sheet, Fig. 1. This latter figure shows that the front side of the sheet comprises the following: The top panel exhibits the piano score and words of the entire composition. The middle panel exhibits our piano aids for playing approximately the first quarter of the composition and further exhibits the piano score of said first quarter printed vertically at the end of the panel. The bottom panel exhibits my piano aids for playing the second quarter of the composition together with a vertical printing of the corresponding part of the piano score.

The charts on the reverse side of the sheet are shown in Fig. 3 and exhibit my aids for playing the third and last portions of the composition respectively. My piano aids will now be described. Since the principles involved are the same in all of the panel charts, Nos. 1 to 4, the description of one chart will suffice for all.

Each such chart occupies a panel of the sheet and is used as shown in Fig. 2. On each such chart is a representation in plan of the white, 16, and black, 18, piano keys full size so that they can be made to align with the corresponding actual piano keys as shown in Fig. 2.

The piano aids as far as possible are printed directly on the related white and black keys of the chart keyboard so that said aids are directly and unmistakably related thereto and through them to the corresponding piano keys for quick recognition and playing by the pupil.

To give increased visibility to the piano aids they are preferably printed dark whereas the chart keyboard is printed light so that the latter may be properly called a phantom keyboard in the preferred form of the device.

The dark line 20 on the chart when the chart is correctly positioned on the piano keyboard aligns with the left side of the piano key "middle C".

The keys to be played are indicated by the black oblongs 22 on the keys of the phantom keyboard which as explained are in vertical alignment with the actual piano keys.

The fingers to be used for correct and easy playing are shown by the numbers 1 to 5 in the white circles on the oblongs. The fingers of each hand are numbered 1 to 5, starting with the thumb as 1.

Except where specifically marked, the oblongs and corresponding piano keys to the left of the middle C line 20 are to be played by the left hand; and those to the right of this line are to be played by the right hand. This is indicated by the designations "Left hand", "Right hand", and by the pictorial left and right hands at the top of the panel.

The order in which the oblongs and the corresponding piano keys are played is from the top of the chart downwardly. This order in the case of a song is also shown by the words of the song which are printed in vertical, downwardly reading arrangement at 24 on each chart, the individual words being in horizontal alignment with the upper end of the related oblong or oblongs 22 belonging to the corresponding notes and piano keys to be played.

Horizontal lines 26 connect the oblongs that are to be played together. The vertical dimension or depth of each oblong 22 shows relatively how long the corresponding piano key is to be held after it has been struck.

The corresponding portion of the music score is printed vertically at the end of the chart. The notes of this score are in horizontal alignment with the upper end of related oblongs 22 on the chart.

Horizontal lines 28 on the chart are aligned with the measure lines of this score so that the vertical distance between said horizontal lines 28 on the chart indicates the length of the musical measures and is a means of judging the time value of the notes represented by the depth of the oblongs. Thus the deepest oblongs filling the whole space between these horizontal lines 28 are whole notes to be held for four counts in case the composition is written in four quarter time. The chart shows at 30 in vertical arrangement, the numerals for counting the time. On the other hand an oblong whose depth equals only one-quarter of the vertical distance between the horizontal lines 28 is immediately seen to be a quarter note to be held for only one count. In the same way, half, eighth, sixteenth and notes of other duration are easily recognized by comparing the depths of the oblongs with the distance between the horizontal lines.

The arrow-pointed lines 32 serve independently of the words of a song to indicate the order in which the oblongs 22 are to be played.

To use the device, the user will fold the sheet so that panel chart No. 1 representing the first part of the composition is exposed and resting on the back of the keyboard with its phantom keyboard in proper alignment with the actual piano keys. The pupil will then play the notes (oblongs) of the right hand alone until these can be readily played smoothly and rhythmically. Likewise with the left hand alone and then with both hands. Then the pupil will play from the music score at the end of the chart by studying the relation of each oblong to the notes of said score and by noting the key location and length of each note as it is to be played on the piano keyboard. As a further aid, each key of the phantom keyboard is marked and identified at the bottom of the chart by name and by its musical notation. Finally, as each panel chart is mastered, then the music score chart No. 5 is placed on the piano rack and the music played from it.

What I claim is:

1. A chart of the class described for use on a piano to designate the keys to be struck in playing a composition, comprising a chart with vertical lines forming spaces to correspond with the keys of the piano, characters, lines marked horizontally across the chart forming spacings, said spacings having the characters therein to be played in the respective spacings, broken lines joining the characters intended to be played by one hand and continuous lines joining others of the characters intended to be played by the other hand, and arrows on the chart for indicating the sequence in which the characters are to be played.

2. A chart of the class described for use on a piano to designate the keys to be struck in playing a composition, comprising a chart with vertical lines forming spaces to correspond with the keys of the piano, characters whose size designates the duration of the note to be played, lines marked horizontally across the chart forming spacings, said spacings having characters therein to be played in the respective spacing, broken lines joining the characters intended to be played by one hand and continuous lines joining others of the characters intended to be played with the other hand, and arrows on the chart for indicating the sequence in which the characters are to be played.

3. A chart of the class described for use on a piano to designate the key to be struck in playing a composition, comprising a chart with vertical lines forming spaces to correspond with the keys of the piano, lines marked horizontally across the chart forming spacings, characters on the representation of the keys, said characters being between the horizontal spacing and having thereon indicating marks to show which hand and what finger of said hand is to play the corresponding key on the piano, with broken lines joining the characters intended to be played by one hand and continuous lines joining others of the characters intended to be played by the other hand and arrows on the chart for indicating the sequence in which the characters joined by the broken lines are to be played.

4. A chart of the class described for use on a piano to designate the keys to be struck in playing a composition, comprising a chart formed with vertical lines forming spaces to correspond with the keys of the piano, said keys having both their musical notation and the name of the key thereon, oblong characters on the keys, the relative depth or vertical dimension of the oblong designating the duration that the key is to be held, bar lines marked horizontally across the chart forming spaces to indicate the time of the music, said spaces having the oblong characters therein to be played in the respective spaces, lines joining in sequential order the oblong characters in a manner to indicate the order in which they are to be played, with the musical score for the music being played arranged in a vertical manner at one end of the chart so that the time of the musical score corresponds with that shown in relation to the oblong characters.

5. A piano playing chart having thereon a reproduction of piano keys in substantially actual size, said chart being supportable with the keys represented thereon registering with corresponding keys of the piano, horizontal bar lines across the chart and the keys thereon showing the time in which the composition is written, the words of the composition being arranged in vertical arrangement so that the proper word is within the horizontal space formed by the bar lines, oblong characters each having indicating marks thereon for the hand and finger of the hand with which it is to be played, lines connecting the oblong characters so as to indicate the sequence in which the corresponding key of the piano is to be struck, with the musical score of the composition arranged in vertical alignment at one end of the chart so that the bars of the musical score correspond with the words of the composition and with the keys and the order in which they are played through the horizontal bar lines of the chart.

JOHN C. BOSTELMANN, Jr.